United States Patent
Jakubec et al.

(10) Patent No.: US 10,183,597 B2
(45) Date of Patent: Jan. 22, 2019

(54) SYSTEM COMPRISING A PIVOTABLE ARMREST AND A PENDULUM ELEMENT

(71) Applicant: Johnson Controls Technology Company, Plymouth, MI (US)

(72) Inventors: Ivan Jakubec, Trnava (SK); Michal Martinka, Nove Mesto nad Vahom (SK); Miroslav Rezbarik, Trencin (SK)

(73) Assignee: ADIENT LUXEMBOURG HOLDING S.A.R.L., Luxembourg (LU)

( * ) Notice: Subject to any disclaimer, the term of this patent is extended or adjusted under 35 U.S.C. 154(b) by 0 days.

(21) Appl. No.: 15/037,831

(22) PCT Filed: Nov. 21, 2014

(86) PCT No.: PCT/EP2014/075324
§ 371 (c)(1),
(2) Date: May 19, 2016

(87) PCT Pub. No.: WO2015/078792
PCT Pub. Date: Jun. 4, 2015

(65) Prior Publication Data
US 2016/0288672 A1    Oct. 6, 2016

(30) Foreign Application Priority Data

Nov. 27, 2013  (DE) .......................... 10 2013 019 719
Mar. 31, 2014  (DE) .......................... 10 2014 206 031

(51) Int. Cl.
*B60N 2/433* (2006.01)
*B60N 2/75* (2018.01)
*B60N 2/42* (2006.01)

(52) U.S. Cl.
CPC ............... *B60N 2/433* (2013.01); *B60N 2/43* (2013.01); *B60N 2/757* (2018.02)

(58) Field of Classification Search
CPC ...... B60N 2/4613; B60N 2/433; B60N 2/757; B60N 2/43
See application file for complete search history.

(56) References Cited

U.S. PATENT DOCUMENTS 5,476,307 A    12/1995  Whalen
5,620,228 A *  4/1997  Ito ............................ A47C 7/68
                                                  297/188.17

(Continued)

FOREIGN PATENT DOCUMENTS

CN    201 998 856 U    10/2011
DE    34 14 316 C2     5/1988

(Continued)

*Primary Examiner* — David R Dunn
*Assistant Examiner* — Tania Abraham
(74) *Attorney, Agent, or Firm* — McGlew and Tuttle, P.C.

(57) ABSTRACT

A system includes a pivotable armrest (1) and a pendulum element (18). The armrest (1) is pivotably hinged on a holding device (10) around a primary axis (11). The armrest (1) is connected rotatably fixed to a connection element (15). The holding device (10) includes the pendulum element (18). The pendulum element (18) is pivotable around a secondary axis (12). The connection element (15) and the pendulum element (18) are configured such that the pendulum element (18) is pivoted into a first position when a force is exerted on the system. The pendulum element (18) pivoted in the first position interlockingly interacts with the connection element (15) in such a way that a pivoting of the connection element along a second direction of rotation (32) is countered. The first direction of rotation (31) runs counter to the second direction of rotation (32).

8 Claims, 2 Drawing Sheets

(56) References Cited

U.S. PATENT DOCUMENTS

| | | |
|---|---|---|
| 5,658,043 A | 8/1997 | Davidson |
| 5,873,633 A | 2/1999 | Lang et al. |
| 2014/0054946 A1* | 2/2014 | Pichler-Wilhelm ...... B60N 2/43 297/411.2 |

FOREIGN PATENT DOCUMENTS

| | | |
|---|---|---|
| DE | 37 01 419 A1 | 7/1988 |
| EP | 0 518 358 A1 | 12/1992 |

* cited by examiner

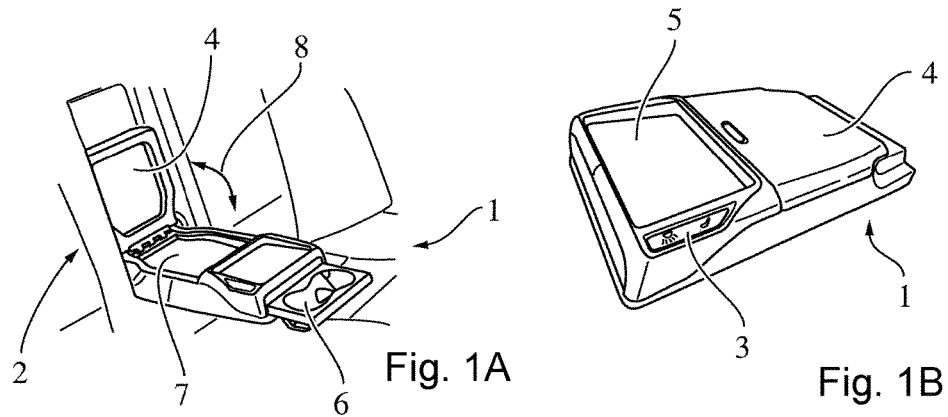
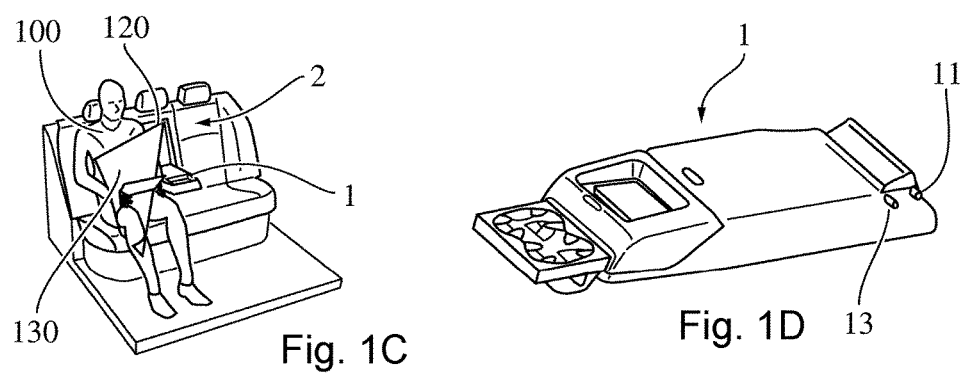
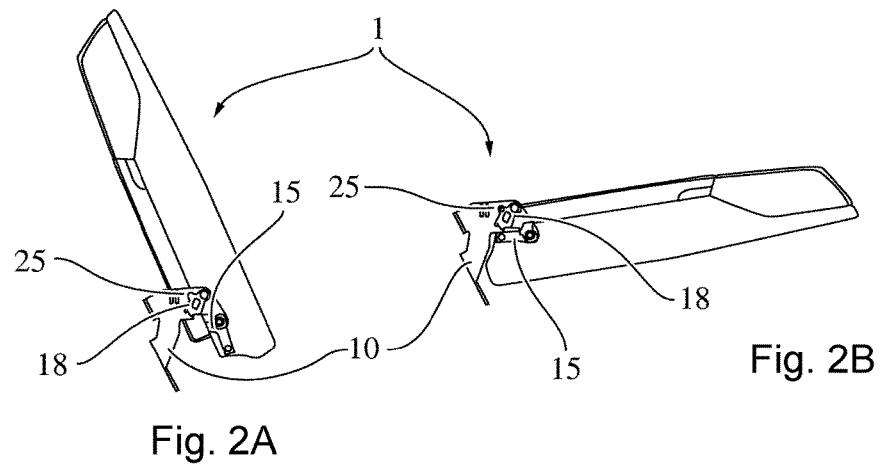

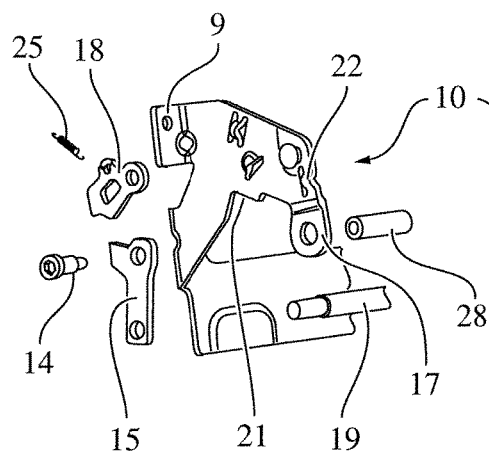
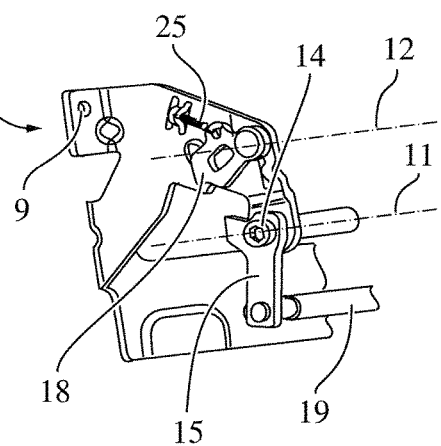
Fig. 3A    Fig. 3B
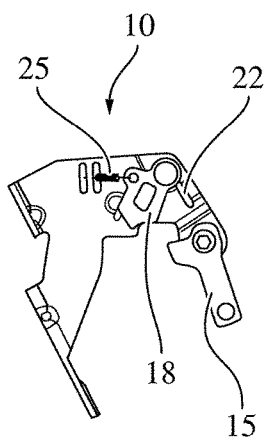
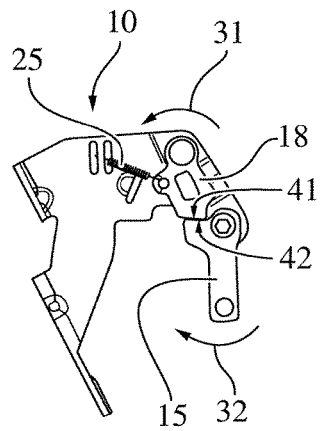
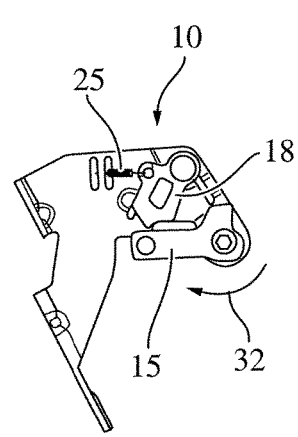
Fig. 4A    Fig. 4B    Fig. 4C

SYSTEM COMPRISING A PIVOTABLE ARMREST AND A PENDULUM ELEMENT

CROSS REFERENCE TO RELATED APPLICATIONS

This application is a U.S. National Phase Application of International Application PCT/EP2014/075324 filed Nov. 21, 2014 and claims the benefit of priority under 35 U.S.C. § 119 of German Applications 10 2013 019 719.8, filed Nov. 27, 2013, and 10 2014 206 031.1, filed Mar. 31, 2014, the entire contents of which are incorporated herein by reference.

FIELD OF THE INVENTION

The present invention relates to pivotable armrests. Pivotable armrests are known from the prior art and can commonly be found on vehicle seats, preferably on the backrests thereof. In particular, pivotable armrests can, when not presently being used, be transferred into a space-saving stowage position. Typically, the backrest comprises a recess into which the pivotable armrest can be pushed for stowage purposes. In the usage position, the armrest may not only serve as a support for an arm but may also further increase comfort for the passenger by way of additional stowage area or easily accessible operating elements.

BACKGROUND OF THE INVENTION

A disadvantage of the pivotable armrests from the prior art is that, in an accident situation or during intense braking of the motor vehicle, forces can arise which cause the pivotable armrest to pivot in uncontrolled fashion out of its stowage position, whereby the risk of injury to passengers is increased.

SUMMARY OF THE INVENTION

It is an object of the present invention to provide a system by way of which, in an accident situation, the pivotable armrest is prevented from pivoting in uncontrolled fashion out of a stowage position. Here, it is desirable for the measures implemented for this purpose to as far as possible not impair the functionality and the operation of the pivotable armrest in the normal situation, that is to say in a non-accident or non-braking situation. Furthermore, the system should return to a functional state as quickly and easily as possible after the accident or braking situation.

The object of the present invention is achieved by way of a system having a pivotable armrest and having a pendulum element, wherein the armrest is articulated on a bracket means (bracket device) so as to be pivotable about a primary axis, wherein the armrest is connected rotationally conjointly to a connecting element and the bracket means has the pendulum element, wherein the pendulum element is pivotable about a secondary axis, wherein the connecting element and the pendulum element are configured such that, when a force acts on the system, the pendulum element can be pivoted into a first position, wherein the pivoted pendulum element, in the first position, interacts in positively locking fashion with the connecting element such that the positive locking action counteracts a pivoting of the connecting element along a second direction of rotation, wherein the first direction of rotation runs oppositely to the second direction of rotation.

In particular, provision is made for the system to be arranged in a vehicle, preferably on a vehicle seat. By means of the system according to the invention, it is possible, by way of the positively locking interaction of connecting element and pendulum element, to prevent the pivotable armrest from departing from a stowage position if a corresponding force, in particular a pseudo force, acts on the system along the force direction. The force on the system may be caused for example by an accident situation or intense braking, and acts along a force direction, that is to say substantially along a direction running perpendicular to the primary axis, in particular along a direction predefined by a direction of travel. Provision is also made for the armrest to be arranged substantially vertically when in the stowage position and to be arranged substantially horizontally when in the usage position. In particular, provision is made for the armrest

- to be transferred from the stowage position into the usage position by way of a pivoting movement about the primary axis along a first direction of rotation, and
- to be transferred from the usage position into the stowage position by way of a pivoting movement about the primary axis along a second direction of rotation, wherein the first direction of rotation is opposite to the second direction of rotation. In particular, provision is made whereby the pivotable armrest can be reversibly transferred between a usage position and a stowage position, wherein the system is configured such that the positively locking interaction of the pendulum element prevents the armrest from departing from the stowage position. In particular, the first position is a position provided for the positive locking action.

In a further embodiment, provision is made for the pendulum element to be connected to the bracket means by way of a spring element which has a restoring force, wherein the spring element is configured such that the restoring force counteracts a pivoting movement of the pendulum element along the first direction of rotation. In this way, in the normal situation, that is to say in the non-accident situation or in the non-braking situation, the pendulum element is advantageously prevented, by the spring element, from interacting with the connecting element. In particular, the spring element is configured such that, in the normal situation, the pendulum element is arranged so as to be free from contact with the connecting element. Furthermore, provision is made whereby the spring element returns the pendulum element into its original position immediately after the accident situation or after the braking situation.

In a further embodiment, provision is made for the spring element to be configured such that the force acting on the system must exceed a threshold value for the pivoting of the pendulum element. A pre-requisite for the pivoting of the pendulum element into a position provided for the positive locking action, that is to say into the first position, is a force which counteracts the restoring force of the spring element and overcomes or overcompensates the restoring force. Through the selection of the spring element, in particular of the restoring force of the spring element, it is accordingly possible to define the magnitude of the force that can transfer the pendulum element into the position provided for the positive locking action. In this way, it is advantageously possible for the sensitivity of the system having the pivotable armrest and having the pendulum element to be set through the suitable selection of the spring element.

In a further embodiment, provision is made for the spring element to be articulated on the bracket means. In particular, the spring element is pivotable, at a first end, about an axis running parallel to the primary axis. In this way, it can be ensured that the maximum possible restoring force of the spring element acts on the pendulum element during the pivoting of the pendulum element. Otherwise, there would be the risk of deformation of the spring element along an undesired direction, whereby the restoring force transmissible to the pendulum element would be reduced.

In a further embodiment, provision is made for the bracket means to have a second abutment, wherein the second abutment is configured such that, during a pivoting of the pendulum element along the first direction of rotation, the positioning of the pendulum element for the positively locking interaction with the connecting element can be assisted by way of the second abutment. In particular, the second abutment is configured such that a pivoting of the pendulum element along the first direction of rotation is ended. The second abutment preferably interacts with the pendulum element in positively locking fashion along the first direction of rotation in order to end the pivoting movement. In other words: the pendulum element abuts against the second abutment and is thereby positioned for the positively locking interaction with the connecting element. In this way, it is advantageously possible to avoid a situation in which the pendulum element pivots beyond the position provided for the positive locking action and thus the positive locking cannot be ensured. By way of the second abutment, it is advantageously possible to realize a system in which the positively locking interaction of pendulum element and connecting element can be ensured if the force acting on the system is greater than a threshold value.

In a further embodiment, provision is made for the pendulum element and the connecting element to be configured such that the positively locking interaction between pendulum element and connecting element takes place along a direction running substantially perpendicular to the force direction (of the force acting on the system). In this way, it is possible to realize a system having a pivotable armrest and having a pendulum element, by way of which system the force acting on the system is channeled into the positively locking interaction of two elements along a direction running perpendicular to the force direction.

In a further embodiment, provision is made for the pendulum element to comprise a first contact surface and for the connecting element to comprise a second contact surface, wherein the first contact surface and the second contact surface are in contact during the positively locking interaction of the pendulum element with the connecting element. In particular, provision is made for the first and the second contact surface to be of complementary design with respect to one another. In particular, it is conceivable for the first and the second contact surface to be configured such that the first and the second contact surface support the positive locking action. Furthermore, it is conceivable for the first contact surface, in terms of its length along the circumference, to make up more than 10% of the circumference of the pendulum element, and/or for the second contact surface, in terms of its length along the circumference, to make up more than 10% of the circumference of the connecting element. Here, "circumference" is to be understood to mean the circumference of pendulum element and connecting element in a plane running perpendicular to the primary axis.

In a further embodiment, provision is made for the connecting element to have a stop element, wherein, in the usage position, the stop element interacts with a first abutment of the bracket means in positively locking fashion along the second direction of rotation. In this way, it is advantageously possible to avoid a situation in which the armrest is pivoted beyond the usage position as a result of a pivoting movement along the second direction of rotation. The first abutment is advantageously integrated into the bracket means, whereby a particularly compact system with pivotable armrest and pendulum element can be realized.

A further subject of the present invention is a backrest which has a system having a pivotable armrest and having a pendulum element, as has been described above.

A further subject of the present invention is a vehicle seat which has a system having a pivotable armrest and having a pendulum element, as has been described above.

Further details, features and advantages of the invention will emerge from the drawings and from the following description of preferred embodiments on the basis of the drawings. Here, the drawings illustrate merely exemplary embodiments of the invention, which do not restrict the essential concept of the invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1A is a perspective view showing a tilting movement of a flap articulated on an armrest and showing a beverage holder in a usage position, pulled out of the armrest;

FIG. 1B is a perspective view of the armrest with the flap pivoted down and beverage holder pushed into the armrest;

FIG. 1C is a perspective view of the armrest integrated into a backrest of a rear bench of a vehicle;

FIG. 1D is a perspective view of the armrest with the flap pivoted down and the beverage holder in a usage position, pulled out of the armrest;

FIG. 2A is a side view showing a pivotable armrest as per a first exemplary embodiment, in a stowage position;

FIG. 2B is a side view showing a pivotable armrest as per a first exemplary embodiment, in a usage position;

FIG. 3A is an exploded illustration showing a bracket means for a system having a pivotable armrest and having a pendulum element as per the first exemplary embodiment of the present invention;

FIG. 3B is a perspective view showing a bracket means for a system having a pivotable armrest and having a pendulum element as per the first exemplary embodiment of the present invention;

FIG. 4A is a side view showing the bracket means for the system having the pivotable armrest and having the pendulum element as per the first exemplary embodiment of the present invention, wherein the armrest is situated in the stowage position;

FIG. 4B is a side view showing the bracket means for the system having the pivotable armrest and having the pendulum element as per the first exemplary embodiment of the present invention, wherein the armrest is situated in an accident position; and FIG. 4C is a side view showing the bracket means for the system having the pivotable armrest and having the pendulum element as per the first exemplary embodiment of the present invention, wherein the armrest is situated in the usage position.

DESCRIPTION OF THE PREFERRED EMBODIMENTS

In the various figures, identical parts are always denoted by the same reference designations, and will therefore generally also be named or mentioned in each case only once.

FIGS. 1A-D illustrate, in four images, examples of pivotable armrests 1 that relate to the present invention. Armrests 1 of said type are preferably integrated into a backrest 2 of a vehicle seat, in particular into the backrest 2 of a rear bench of a vehicle. Here, the armrest 1 can be reversibly transferred between a stowage position and a usage position. In the usage position, a passenger 100 of the vehicle can support his or her arm on the armrest. In particular, the armrest is encased with a cushioning such that the passenger 100 can, in the stowage position, lean his or her back against a first cushioned side of the armrest 1 and can, in the usage position, support his or her arm on a second cushioned side of the armrest 1. It is furthermore conceivable for the armrest 1 to have a stowage compartment 7 which, in the usage position, is accessible via a flap 4 incorporated into the armrest 1. In particular, it is conceivable for the flap 4 to be articulated on the armrest 1 so as to be pivotable about a flap axis 13 by way of a tilting movement 8. It is furthermore conceivable for the armrest 1 to at least partially provide for the passenger 100 a utility surface 5, in particular in the front third of the armrest 1, on which utility surface the passenger 100 can temporarily store or place articles when the armrest 1 is in the usage position. It is furthermore conceivable for the pivotable armrest 1 to have actuation elements 3, such as for example pushbuttons, rotary buttons or other switches, in particular integrated into a control panel or switch panel, wherein the actuation of the actuation element 3 effects a change in the vehicle interior compartment, preferably at the vehicle seat. For example, the temperature or the illumination in the vehicle interior compartment can be changed. It is furthermore conceivable for the pivotable armrest 1 to comprise a beverage holder 6, wherein the beverage holder 6 can, in the usage position, be pulled out of the armrest 1. Provision is furthermore made for the backrest 2 of the vehicle seat to have a backrest recess into which the armrest 1 is pushed in order to assume the stowage position. The backrest recess preferably has an illuminable wall which provides ambient light for the vehicle interior compartment. In particular, the backrest recess has a wall on which light sources 120 can be arranged, wherein a light cone 130 emitted by the light source 120 is directed toward the field of view of the passenger 100, and thereby serves for example as a reading aid for the passenger 100. In particular, it is conceivable for the light source 120 to be pivotable, and thus for the light cone 130 to be individually adjustable.

FIGS. 2A and B illustrates an armrest 1 as per a first exemplary embodiment of the present invention, wherein the armrest 1 is, in FIG. 2A, illustrated in the stowage position and, in FIG. 2B, illustrated in the usage position. Here, provision is made for the armrest to be pivoted through substantially 90° during the transition from the stowage position into the usage position. It is preferable for the armrest 1 to be arranged substantially vertically in the stowage position and substantially horizontally in the usage position. For the pivoting movement, the armrest 1 is articulated on a bracket means 10, wherein the bracket means 10 is in turn connected rigidly to a part of the vehicle, preferably to the backrest 2 of the vehicle seat. A connecting element 15 is fixedly connected to the armrest 1 at at least two points. In particular, the connecting element 15 is connected rotationally conjointly to the armrest 1, that is to say the connecting element 15 is jointly pivoted during the pivoting of the armrest 1. Furthermore, provision is made for the connecting element 15 to have a stop element 19 which prevents a pivoting movement of the armrest 1 beyond the usage position. Here, provision is made whereby, when the usage position is assumed, the stop element 19, with the bracket means 10, interacts, in positively locking fashion along a direction running perpendicular to the primary axis 11, with a first abutment of the bracket means 10, and thus ends a pivoting movement of the armrest 1 during the transfer from the stowage position into the usage position. In particular, provision is made whereby, during a pivoting of the armrest 1 along a second direction of rotation, the connecting element 15 ends the pivoting movement by virtue of the stop element 19 interacting with the bracket means 10, in particular with the first abutment 21 thereof, in positively locking fashion along the second direction of rotation. Furthermore, the bracket means 10 comprises a pendulum element 18, which is articulated on the bracket means 10 so as to be pivotable about a secondary axis 12 and by way of which a spring element 25, which is likewise arranged on the bracket means 10, is positioned. In particular, the spring element 25 ensures that the pendulum element 18 is, in the normal situation, that is to say in a non-accident situation, arranged so as to be substantially free from contact with the connecting element 15.

FIGS. 3A and 3B illustrate the bracket means 10 for the system having the pivotable armrest 1 and having the pendulum element 18 as per the first embodiment of the present invention, wherein the bracket means 10 and the connecting element 15 are illustrated in an exploded illustration in FIG. 3A and in joined-together form in a perspective view in FIG. 3B. Here, provision is made for the bracket means 10 to have a main body which can be fastened by way of fastening devices 9 to a part of the vehicle body or of the interior equipment, for example to the backrest of the vehicle seat. For example, the fastening device is a hole by way of which the bracket means can be fixedly screwed to the vehicle body. Furthermore, a second abutment 22 is provided which limits a pivoting movement of the pendulum element 18 along a first direction of rotation 31. For a pivoting movement of the pendulum element 18 along the first direction of rotation 31, it is firstly necessary for a restoring force of the spring element 25, by way of which the pendulum element 18 is likewise connected to the bracket means 10, to be overcome. Furthermore, provision is made whereby, for the pivoting about the primary axis 11, the pendulum element 18 has a first recess which surrounds a projection of the bracket means 10. Provision is furthermore made for the projection to be configured such that the projection and the main body substantially prevent a movement of the pendulum element 18 along a direction running parallel to the secondary axis 12. Provision may furthermore be made for the main body of the bracket means 10 to have a second recess, preferably a circular cutout 17, in which there is mounted a pivot spindle 28 which is rotatable or pivotable about the primary axis 11. Provision is preferably made for the connecting element 15 and the pivotable armrest 1 to be spatially separated by the main body and to be connected rotationally conjointly to one another by way of the pivot spindle 28 that is mounted rotatably in the second recess. A joining means, for example a screw 14, is provided for the connection of the pivotable armrest 1 and/or of the connecting element 15 to the pivot spindle 28.

FIGS. 4A-C illustrate, in side views, the bracket means 10 for the system having the pivotable armrest 1 and having the pendulum element 18 as per the first exemplary embodiment of the present invention, wherein the armrest 1 is, from left to right, situated in the stowage position (FIG. 4A), in an accident position (FIG. 4B) and in the usage position (FIG. 4C). In the usage position, the pendulum element 18 is prevented, by the restoring force of the spring element 25, from assuming a position otherwise preferred under the action of gravitational force. In such a position, the pendulum element 18 could possibly undesirably come into contact with the connecting element 15 and thereby impede a pivoting movement of the armrest 1. In an accident situation (or even during intense braking), forces, in particular pseudo forces, act on the pendulum element 18. If said forces are great enough to overcome or overcompensate the restoring force of the spring element 25, the pendulum element 18 is pivoted along the first direction of rotation 31. In particular, provision is made whereby the pivoted pendulum element 18 comes into contact, by way of a first contact surface 41, with a second contact surface 42 of the connecting element 15, wherein, by way of positively locking interaction of the pendulum element 18 with the connecting element 15, a pivoting movement of the connecting element 15 along the first direction of rotation 31, which is opposite to the second direction of rotation 32, is prevented. Here, it is conceivable that the connecting element 15 has already been pivoted along the second direction of rotation before the positively locking interaction with the pendulum element 18. Furthermore, provision is made whereby the pendulum element 18 is, by way of the second abutment 22, pre-positioned or oriented for the positively locking interaction. Since the connecting element 15 and the pivotable armrest 1 are connected rotationally conjointly to one another, the positive locking action initiated by the forces that act in the event of an accident prevents the armrest 1 from pivoting in uncontrolled fashion out of the stowage position in the event of an accident. In this way, a risk of injury caused by the armrest 1 in the event of an accident or during intense braking of the vehicle is reduced. Furthermore, provision is made whereby, in the usage position, the pendulum element 18 is arranged by way of the spring element 25 such that the pendulum element 18 does not make contact with the connecting element 15. Here, it is also conceivable for the positive locking action to be eliminated again, by virtue of the spring element 25 returning the pendulum element 18 into its original position again, immediately after the accident or after the intense braking. In this way, the functionality of the pivotable armrest 1 can be restored without further action on the part of the passenger 100. Finally, the pivotable armrest 1 can be transferred into the usage position, wherein the connecting element 15 pivots along a second direction of rotation 32.

While specific embodiments of the invention have been shown and described in detail to illustrate the application of the principles of the invention, it will be understood that the invention may be embodied otherwise without departing from such.

The invention claimed is:

1. A system comprising:
   a pivotable armrest;
   a bracket device comprising a bracket, a pendulum element and a connecting element, wherein the armrest is articulated on the bracket device so as to be pivotable about a primary axis, wherein the armrest is connected rotationally conjointly to the connecting element, wherein the pendulum element is pivotable about a secondary axis, wherein the connecting element and the pendulum element are configured such that, when a force acts on the system, the pendulum element can be pivoted into a first position, wherein the pivoted pendulum element, in the first position, interacts positively lockingly with the connecting element such that the positive locking counteracts a pivoting of the connecting element along a second direction of rotation, wherein a first direction of rotation runs oppositely to the second direction of rotation, the pendulum element being preloaded with a restoring force by way of a spring element, the spring element being configured such that the restoring force counteracts a pivoting movement of the pendulum element along the first direction of rotation, wherein the pivotable armrest can be transferred reversibly between a usage position and a stowage position, wherein the system is configured such that the positively locking interaction prevents the armrest from departing from the stowage position, wherein the armrest runs substantially horizontally in the usage position and runs substantially vertically in the stowage position, the pendulum element being arranged by way of the spring element such that the pendulum element does not make contact with the connecting element in the usage position, wherein the connecting element has a stop element, wherein, in the usage position, the stop element interacts with a first abutment of the device in positively locking fashion along the second direction of rotation.

2. The system as claimed in claim 1, wherein the spring element is articulated on the bracket device.

3. The system as claimed in claim 1, wherein the spring element is configured such that the force acting on the system must exceed a threshold value for the pivoting of the pendulum element.

4. The system as claimed in claim 1, wherein the bracket device has a second abutment, wherein the second abutment is configured such that, during a pivoting of the pendulum element along the first direction of rotation, the positioning of the pendulum element for the positively locking interaction with the connecting element can be assisted by way of the second abutment.

5. The system as claimed in claim 1, wherein the pendulum element and the connecting element are configured such that the positively locking interaction between pendulum element and connecting element takes place along a direction running substantially perpendicular to the force direction.

6. The system as claimed in claim 1, wherein the pendulum element comprises a first contact surface and the connecting element comprises a second contact surface, wherein the first contact surface and the second contact surface are arranged in contact with one another during the positively locking interaction of the pendulum element with the connecting element.

7. The system in accordance with claim 1, wherein one end of the spring is connected directly to the bracket and another end of the spring is connected directly to the pendulum.

8. A system comprising:
   a pivotable armrest;
   a bracket device comprising a bracket, a pendulum element and a connecting element, wherein the armrest is articulated on the bracket device so as to be pivotable about a primary axis, wherein the armrest is connected rotationally conjointly to the connecting element, wherein the pendulum element is pivotable about a secondary axis, wherein the connecting element and the pendulum element are configured such that, when a force acts on the system, the pendulum element can be pivoted into a first position, wherein the pivoted pendulum element, in the first position, interacts positively lockingly with the connecting element such that the positive locking counteracts a pivoting of the connecting element along a second direction of rotation, wherein a first direction of rotation runs oppositely to the second direction of rotation, the pendulum element being preloaded with a restoring force by way of a spring element, the spring element being configured such that the restoring force counteracts a pivoting movement of the pendulum element along the first direction of rotation, wherein the pivotable armrest can be transferred reversibly between a usage position and a stowage position, wherein the system is configured such that the positively locking interaction prevents the armrest from departing from the stowage position, wherein the armrest runs substantially horizontally in the usage position and runs substantially vertically in the stowage position, the pendulum element being arranged by way of the spring element such that the pendulum element does not make contact with the connecting element in the usage position, the bracket device having an abutment, wherein the abutment is configured such that, during a pivoting of the pendulum element along the first direction of rotation, the positioning of the pendulum element for the positively locking interaction with the connecting element can be assisted by the abutment.

\* \* \* \* \*